(12) United States Patent
Chen et al.

(10) Patent No.: US 8,570,576 B2
(45) Date of Patent: Oct. 29, 2013

(54) SCANNER DEVICE AND SCANNING METHOD

(75) Inventors: Guo-Yi Chen, Shenzhen (CN); Xiao-Gang Yin, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 186 days.

(21) Appl. No.: 13/212,190

(22) Filed: Aug. 18, 2011

(65) Prior Publication Data

US 2013/0003112 A1 Jan. 3, 2013

(30) Foreign Application Priority Data

Jun. 29, 2011 (CN) .......................... 2011 1 0179071

(51) Int. Cl.
*G06F 15/00* (2006.01)

(52) U.S. Cl.
USPC ...................................... 358/1.15

(58) Field of Classification Search
USPC ........................................ 358/1.15
See application file for complete search history.

(56) References Cited

U.S. PATENT DOCUMENTS

| 2009/0244615 A1* | 10/2009 | Mizumukai | .............. 358/1.15 |
| 2010/0063888 A1* | 3/2010 | Sajkowsky | .............. 705/17 |
| 2010/0284037 A1* | 11/2010 | Ochi | .............. 358/1.15 |

\* cited by examiner

*Primary Examiner* — Saeid Ebrahimi Dehkordy
(74) *Attorney, Agent, or Firm* — Altis & Wispro Law Group, Inc.

(57) ABSTRACT

A scanner device transmits scanned image data to a predetermined computer having a local area network transmit tool via a local area network. The scanner device includes a scanning module, a storage module, a determination module, and a control module. The scanning module scans a document waiting to be scanned to form an image data. The storage module stores the image data. The determination module determines an IP address of the predetermined computer. The control module transmits the image data to the predetermined computer via the local area network transmit tool based on the IP address of the predetermined computer.

3 Claims, 3 Drawing Sheets

SCANNER DEVICE AND SCANNING METHOD

BACKGROUND

1. Technical Field

The present disclosure relates to scanner devices, and particularly, to a scanner device having fewer elements, and a scanning method using the scanner device.

2. Description of Related Art

Scanners have become more popular. However, a scanner usually needs an assistant computer to transmit a scanned image data to other computers. For example, there is usually one scanner for use in a company, in which U disks are forbidden. Accordingly, the assistant computer is needed to work with the scanner to transmit the image data to other computers.

However, the assistant computer only transmits image data, and other functions of the assistant computer are not in use. Accordingly, the assistant computer is being wasted.

Therefore, what is needed is a scanner device that can overcome the described limitations.

DETAILED DESCRIPTION

Embodiments will now be described in detail with reference to drawings.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
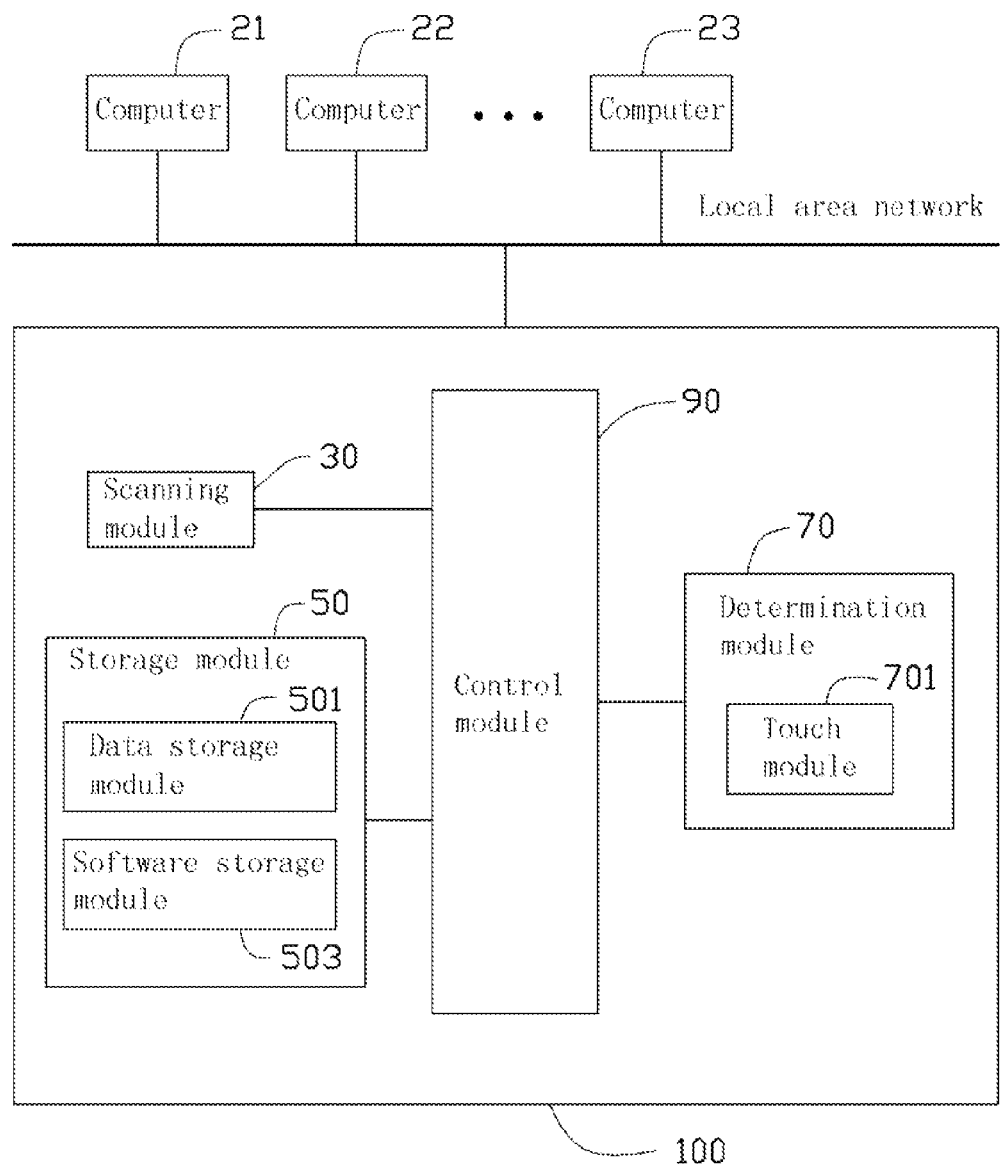
FIG. 1 is a block diagram of a scanner device according to an exemplary embodiment.
Figure 2:
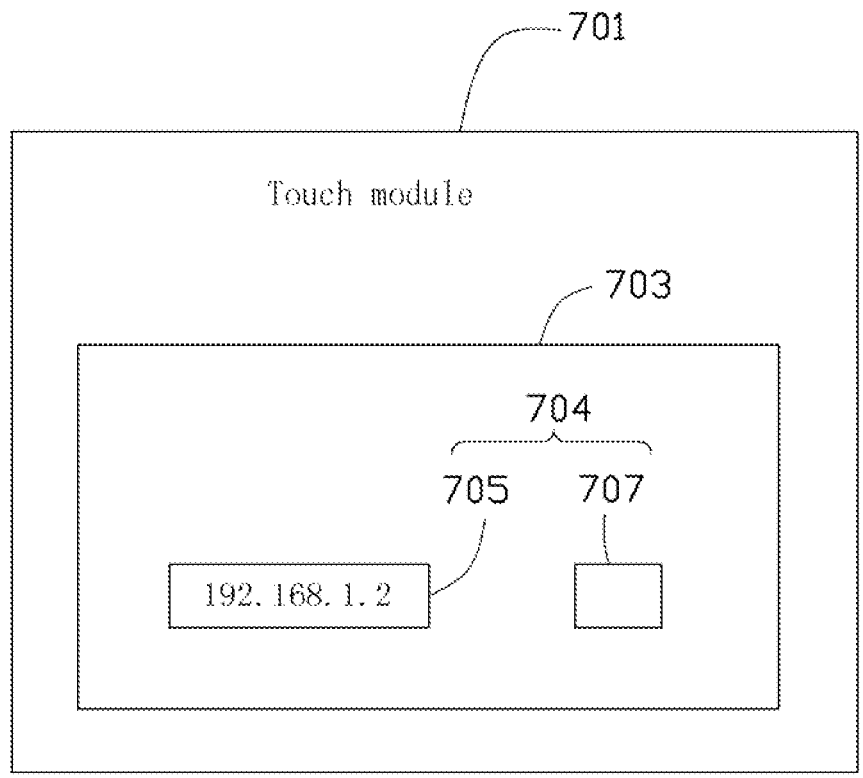
FIG. 2 is an isometric view of a touch module of a determination module of the scanner device of FIG. 1.

Referring to FIGS. 1-2, a scanner device 100, in accordance with an exemplary embodiment, is shown. The scanner device 100 transmits scanned image data via a local area network transition tool in a local area network.

The scanner device 100 is electrically coupled to a plurality of computers via the local area network (i.e. computer 21, computer 22 computer 23). The computers and the scanner device 100 are on a same local area network. One local area network transition tool is arranged on each of the computers. In the present embodiment, the IP address of the scanner device 100 is 192.168.1.0, the IP address of the computer 21 is 192.168.1.1, the IP address of the computer 22 is 192.168.1.2, the IP address of the computer 23 is 192.168.1.9. In other embodiments, the IP addresses of the scanner device 100 and the computers may be defined by the user based on need.

The scanner device 100 includes a scanning module 30, a storage module 50, a determination module 70, and a control module 90.

The scanning module 30 is electrically coupled to the control module 90. The scanning module 30 scans a document waiting to be scanned, and forms an image data based on the scanned document.

The storage module 50 is electrically coupled to the control module 50. The storage module 50 includes a data storage module 501 and a software storage module 503. The data storage module 501 stores the image data. The software storage module 503 stores the local area network transition tool. In the present embodiment, the local area network transition tool is an EasyLan.

The determination module 70 is electrically coupled to the control module 90. The determination module 70 determines an IP address of a predetermined computer in the local area network. The determination module 70 includes a touch module 701 electrically coupled to the control module 90. The touch module 701 includes a touch panel 703 electrically coupled to the control module 90. In the present embodiment, the touch panel 703 includes a work interface 704 for the local area network transition tool. The work interface 704 includes an input frame 705 for inputting the IP address of the predetermined computer, and a determination button 707.

Based on the IP address of the predetermined computer, the control module 90 transmits the image data from the data storage module 501 to the predetermination computer via the local area network transition tool.

Take the computer 22 as a predetermined computer for example, a work process of the scanner device 100 will be described in detail.

First, "192.168.1.2" is input in the input frame 705, and the determination button 707 is clicked, such that the IP address "192.168.1.2" of the computer 22 is transmitted to the control module 90 (i.e. the local area network transition tool is run). The control module 90 receives "192.168.1.2", and orders the touch panel 703 to popup an open file dialog (not shown). Then, the image data from the data storage module 501 can be selected, and an open button of the open file dialog can be clicked, such that the image data can be transmit to the computer 22 via the local area network transition tool.

In alternative embodiments, there may be a IP address list (not shown) shown on the touch panel 703, and the IP address list includes a plurality of IP addresses of the computers electrically coupled to the scanner device 100, which are on the same local area network as the scanner device 100. Accordingly, an IP address of a predetermined computer can be selected from the IP address list.

In further alternative embodiments, the control module 90 may transmit the image data from the data storage module 501 to the predetermined computer via an IP messenger, or a FeiQ.

In the present embodiment, there is no need to have an assistant computer to transmit the image data to the predetermined computer, and the scanner device 100 without the assistant computer directly transmits the image data to the predetermined computer via the determination module 70 and the control module 90. Accordingly, work efficiency is improved, and source is saved (i.e. fewer elements are needed).

Figure 3:
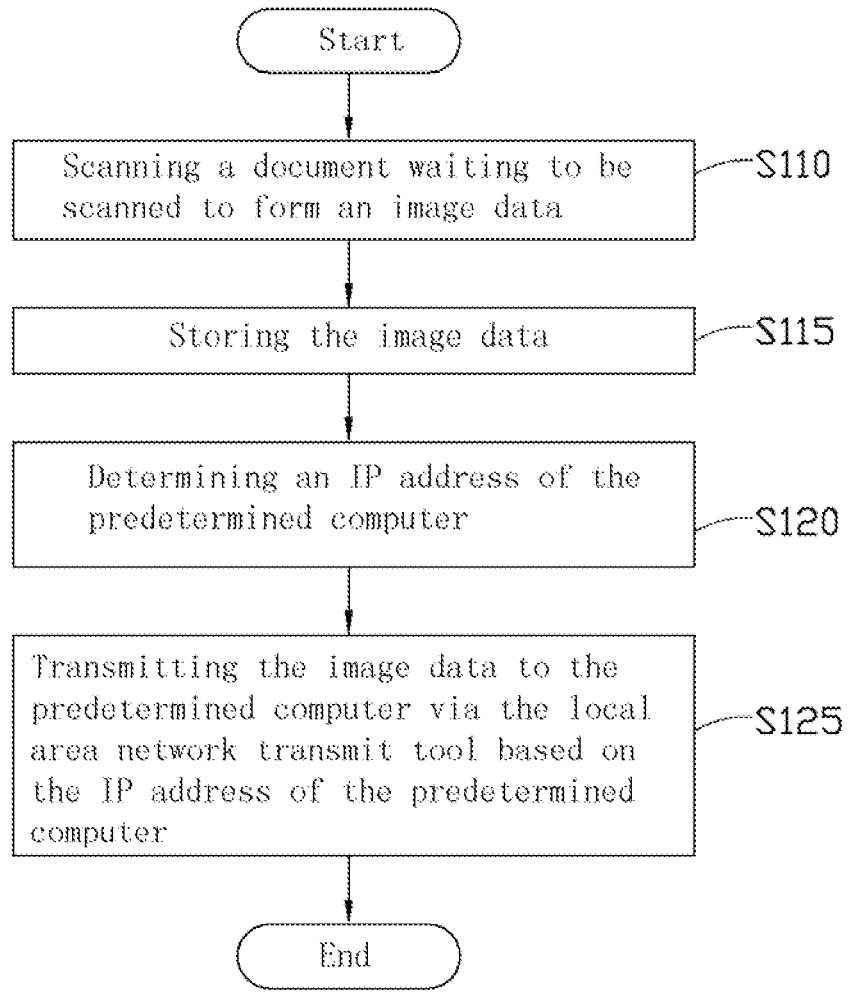
FIG. 3 is a flow chart of a scanning method using the scanner device of FIG. 1.

Referring to FIG. 3, a scanning method for transmitting scanned image data from the scanner device 10 to a determined computer having a local area network transmit tool via a local area network includes the following steps.

Step 110, the document waiting to be scanned is scanned to form an image data. In the present embodiment, the scanning module 50 scans the document waiting to be scanned under the control of the control module 90, and forms the image data.

Step 115, the image data is stored. In the present embodiment, the storage module 50 stores the image data.

Step 120, an IP address of the predetermined computer is determined. In the present embodiment, the IP address of the predetermined computer is input into the input frame 705 to determine the IP address of the predetermined computer.

Step 125, based on the IP address of the predetermined computer, the image data is transmitted to the predetermined computer via the local area network transmit tool. In the present embodiment, based on the IP address of the predetermined computer, the control module 90 transmits the image data to the predetermined computer via the local area network transmit tool.

While certain embodiments have been described and exemplified above, various other embodiments will be apparent from the foregoing disclosure to those skilled in the art. The disclosure is not limited to the particular embodiments described and exemplified but is capable of considerable variation and modification without departure from the scope and spirit of the appended claims.

What is claimed is:

1. A scanner device for transmitting scanned image data to a predetermined computer having a local area network transmit tool via a local area network, the scanner device comprising:
   a scanning module that scans a document waiting to be scanned to form an image data;
   a storage module comprising a data storage module and a software storage module, the data storage module that stores the image data, and the software storage module that stores the local area network transmit tool;
   a determination module that determines an IP address of the predetermined computer; and
   a control module that transmits the image data to the predetermined computer via the local area network transmit tool based on the IP address of the predetermined computer.

2. The scanner device of claim 1, wherein the local area network transmit tool is an EasyLan, an IP messenger, or a FeiQ.

3. The scanner device of claim 2, wherein the determination module comprises a touch module, the touch module is configured for inputting or selecting the IP address of the predetermined computer.

* * * * *